(12) United States Patent
Hwang et al.

(10) Patent No.: US 9,799,140 B2
(45) Date of Patent: Oct. 24, 2017

(54) METHOD AND APPARATUS FOR GENERATING PERSONALIZED 3D FACE MODEL

(71) Applicant: Samsung Electronics Co., Ltd., Suwon-si, Gyeonggi-do (KR)

(72) Inventors: Youngkyoo Hwang, Seoul (KR); Jungbae Kim, Seoul (KR); Seon Min Rhee, Seoul (KR); Jaejoon Han, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/882,624

(22) Filed: Oct. 14, 2015

(65) Prior Publication Data

US 2016/0148425 A1 May 26, 2016

(30) Foreign Application Priority Data

Nov. 25, 2014 (KR) .................. 10-2014-0165506

(51) Int. Cl.
*G06T 17/20* (2006.01)
*G06K 9/00* (2006.01)
(Continued)

(52) U.S. Cl.
CPC .......... *G06T 17/20* (2013.01); *G06K 9/00208* (2013.01); *G06K 9/00268* (2013.01);
(Continued)

(58) Field of Classification Search
CPC ....... G06T 7/0089; G06T 11/40; G06T 15/00; G06T 15/04; G06T 15/10; G06T 17/00;
(Continued)

(56) References Cited

U.S. PATENT DOCUMENTS 6,208,347 B1 3/2001 Migdal et al.
6,556,196 B1 * 4/2003 Blanz ................. G06K 9/00275
345/419

(Continued)

FOREIGN PATENT DOCUMENTS

EP 1039417 B1 12/2006
JP 2013-196294 A 9/2013
(Continued)

OTHER PUBLICATIONS

Pighin, Frédéric, Richard Szeliski, and David H. Salesin. "Modeling and animating realistic faces from images." International Journal of Computer Vision 50.2 (2002): 143-169.*

(Continued)

*Primary Examiner* — Ulka Chauhan
*Assistant Examiner* — Sae Won Yoon
(74) *Attorney, Agent, or Firm* — Harness, Dickey & Pierce, P.L.C.

(57) ABSTRACT

A method of generating a three-dimensional (3D) face model includes extracting feature points of a face from input images comprising a first face image and a second face image; deforming a generic 3D face model to a personalized 3D face model based on the feature points; projecting the personalized 3D face model to each of the first face image and the second face image; and refining the personalized 3D face model based on a difference in texture patterns between the first face image to which the personalized 3D face model is projected and the second face image to which the personalized 3D face model is projected.

14 Claims, 6 Drawing Sheets

(51) Int. Cl.
*G06T 15/04* (2011.01)
*G06T 17/00* (2006.01)

(52) U.S. Cl.
CPC .......... *G06K 9/00281* (2013.01); *G06T 15/04* (2013.01); *G06T 17/00* (2013.01)

(58) Field of Classification Search
CPC ......... G06T 17/10; G06T 17/20; G06T 19/00; G06T 2200/08; G06T 7/50; G06T 7/55; G06T 7/593; G06T 7/596; G06K 9/00221; G06K 9/00261; G06K 9/00275; G06K 9/00268
USPC ........................................ 345/419
See application file for complete search history.

(56) References Cited

U.S. PATENT DOCUMENTS

| | | | |
|---|---|---|---|
| 6,879,323 B1* | 4/2005 | Takezawa | G06T 17/00 340/5.83 |
| 7,139,439 B2 | 11/2006 | Hwang | |
| 7,272,255 B2 | 9/2007 | Ishiyama | |
| 7,415,152 B2 | 8/2008 | Jiang et al. | |
| 7,583,271 B2 | 9/2009 | Kawakami et al. | |
| 7,646,909 B2 | 1/2010 | Jiang et al. | |
| 2003/0113036 A1* | 6/2003 | Hwang | G06T 15/04 382/285 |
| 2005/0063582 A1 | 3/2005 | Park et al. | |
| 2006/0126924 A1* | 6/2006 | Liu | G06K 9/00201 382/154 |
| 2006/0210148 A1* | 9/2006 | Nakashima | G06K 9/00208 382/154 |
| 2007/0091085 A1 | 4/2007 | Wang et al. | |
| 2007/0183653 A1* | 8/2007 | Medioni | G06K 9/00208 382/154 |
| 2008/0309662 A1 | 12/2008 | Hassner et al. | |
| 2010/0214290 A1 | 8/2010 | Shiell et al. | |
| 2010/0215255 A1* | 8/2010 | Xiao | G06K 9/621 382/159 |
| 2012/0183238 A1 | 7/2012 | Savvides et al. | |
| 2012/0306874 A1* | 12/2012 | Nguyen | G06T 19/00 345/420 |
| 2013/0201187 A1 | 8/2013 | Tong et al. | |
| 2013/0286161 A1 | 10/2013 | Lv et al. | |
| 2013/0287294 A1 | 10/2013 | Ye et al. | |
| 2014/0043329 A1* | 2/2014 | Wang | G06T 17/20 345/420 |

FOREIGN PATENT DOCUMENTS

| | | |
|---|---|---|
| KR | 2002-0049504 A | 6/2002 |
| KR | 2010-0450210 B1 | 9/2004 |
| KR | 10-0682889 B1 | 2/2007 |
| KR | 2010-0919104 B1 | 9/2009 |
| KR | 2011-0088361 A | 8/2011 |
| KR | 2012-0047616 A | 5/2012 |
| KR | 2013-0137999 A | 12/2013 |
| WO | WO-2012/082077 A2 | 6/2012 |
| WO | WO-2012/126135 A1 | 9/2012 |

OTHER PUBLICATIONS

Blanz, Volker, and Thomas Vetter. "Face recognition based on fitting a 3D morphable model." IEEE Transactions on pattern analysis and machine intelligence 25.9 (2003): 1063-1074.*

Blanz, Volker, and Thomas Vetter. "A morphable model for the synthesis of 3D faces." Proceedings of the 26th annual conference on Computer graphics and interactive techniques. ACM Press/Addison-Wesley Publishing Co., 1999.*

S. Huq et al., "A Survey on 3D Modeling of Human Faces for Face Recognition," 3D Imaging for Safety and Security, 2007, p. 25-67, Springer, XP055184073.

Y. Gao et al., "Automatic construction of 3D animatable facial avatars," Computer Animation and Virtual Worlds, 2010, vol. 21, p. 343-354, John Wiley & Sons, Ltd., XP055032197.

Extended European Search Report for European Application No. 15195543.2 dated Mar. 30, 2016.

* cited by examiner

FROM 630

710
EXTRACT CORRESPONDENCE POINT BETWEEN FIRST FACE IMAGE TO WHICH PERSONALIZED 3D FACE MODEL IS PROJECTED AND SECOND FACE IMAGE TO WHICH PERSONALIZED 3D FACE MODEL IS PROJECTED

720
REFINE SHAPE OF PERSONALIZED 3D FACE MODEL TO MAKE TEXTURE PATTERN OF FIRST FACE IMAGE AND TEXTURE PATTERN OF SECOND FACE IMAGE BECOME ANALOGOUS TO EACH OTHER IN PERIPHERAL AREA OF CORRESPONDENCE POINT

END

METHOD AND APPARATUS FOR GENERATING PERSONALIZED 3D FACE MODEL

CROSS-REFERENCE TO RELATED APPLICATION

This application claims under 35 U.S.C. §119 to Korean Patent Application No. 10-2014-0165506, filed on Nov. 25, 2014, in the Korean Intellectual Property Office, the entire contents of which are incorporated herein by reference in its entirety.

BACKGROUND

1. Field

Example embodiments relate to technology for generating a three-dimensional (3D) face model based on an input image.

2. Description of the Related Art

When representing a face pose, an illumination, a facial expression, and the like, three-dimensional (3D) face modeling may provide a more precise and realistic perception compared to two-dimensional (2D) face modeling, and is desired in fields such as face recognition, games, and avatars. A 3D face modeling method includes a method of modeling a 3D face of a user using a 3D depth camera or a 3D scanner. The method using a 3D depth camera models a 3D face of a user using a stereo matching scheme. The method using a 3D scanner models a 3D face of a user using 3D data scanned through the 3D scanner. A 3D coordinate value and a color value are acquired with respect to each of sampling points on the surface of the face of the user, and 3D face modeling is performed on the user face based on the acquired 3D coordinate value and color value.

SUMMARY

1.

According to at least one example embodiment, a method of generating a three-dimensional (3D) face model includes extracting feature points of a face from input images comprising a first face image and a second face image; deforming a generic 3D face model to a personalized 3D face model based on the feature points; projecting the personalized 3D face model to each of the first face image and the second face image; and refining the personalized 3D face model based on a difference in texture patterns between the first face image to which the personalized 3D face model is projected and the second face image to which the personalized 3D face model is projected.

The refining may include extracting a correspondence point between the first face image to which the personalized 3D face model is projected and the second face image to which the personalized 3D face model is projected; and generating a comparison based on a texture pattern of the first face image and a texture pattern of the second face image in a peripheral area of the correspondence point.

The refining may include refining a shape of the personalized 3D face model to make a similarity between the texture pattern of the first face image and the texture pattern of the second face image exceed a threshold degree of similarity in the peripheral area of the correspondence point.

The refining may include, iteratively, determining if a first condition is satisfied, and refining a shape of the personalized 3D face model based on the difference in texture patterns, until the first condition is satisfied.

The refining may include determining a pose deformation parameter and a shape control parameter that reduce the difference in texture patterns between the first face image and the second face image in the peripheral area of the correspondence point; and applying the determined pose deformation parameter and shape control parameter to the personalized 3D face model.

The shape control parameter may control a spatial location of each of vertices constituting the personalized 3D face model.

The projecting may include projecting the personalized 3D face model to the first face image based on a facial pose included in the first face image; and projecting the personalized 3D face model to the second face image based on a facial pose included in the second face image.

The deforming may include acquiring the personalized 3D face model by mapping landmark points of the generic 3D face model to the extracted feature points.

The input images may be two-dimensional (2D) images, and the input images may include at least one frontal image captured from a front of a user face and at least one side face image captured from a side of the user face.

According to at least one example embodiment, a non-transitory computer-readable medium stores computer-readable instructions that, when executed by one or more processors, cause the one or more processors to perform operations including, extracting feature points of a face from input images comprising a first face image and a second face image, deforming a generic 3D face model to a personalized 3D face model based on the feature points, projecting the personalized 3D face model to each of the first face image and the second face image, and refining the personalized 3D face model based on a difference in texture patterns between the first face image to which the personalized 3D face model is projected and the second face image to which the personalized 3D face model is projected.

According to at least one example embodiment, an apparatus for generating a three-dimensional (3D) face model includes a memory storing computer-readable instructions; and one or more processors configured to execute the computer-readable instruction to, extract feature points of a face from input images comprising a first face image and a second face image, deform a generic 3D face model to a personalized 3D face model based on the feature points, and refine the personalized 3D face model based on a difference in texture patterns between the first face image to which the personalized 3D face model is projected and the second face image to which the personalized 3D face model is projected.

The one or more processors may be configured to extract a correspondence point between the first face image to which the personalized 3D face model is projected and the second face image to which the personalized 3D face model is projected, and compare a texture pattern of the first face image and a texture pattern of the second face image in a peripheral area of the correspondence point.

The one or more processors may be configured to refine a shape of the personalized 3D face model to make a similarity between the texture pattern of the first face image and the texture pattern of the second face image exceed a threshold degree of similarity in the peripheral area of the correspondence point.

The one or more processors may be configured to, iteratively, determine if a first condition is satisfied, and refine a shape of the personalized 3D face model based on the difference in texture patterns, until the first condition is satisfied.

The one or more processors may be configured to, determine a pose deformation parameter and a shape control parameter that reduce the difference in texture patterns between the first face image and the second face image in the peripheral area of the correspondence point, and apply the determined pose deformation parameter and shape control parameter to the personalized 3D face model.

The one or more processors may be further configured to execute the computer-readable instructions to store the refined personalized 3D face model.

The one or more processors may be configured to acquire the personalized 3D face model by mapping landmark points of the generic 3D face model to the extracted feature points.

The input images may be two-dimensional (2D) images, and the input images may include at least one frontal image captured from a front of a user face and at least one side face image captured from a side of the user face.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Figure 1:
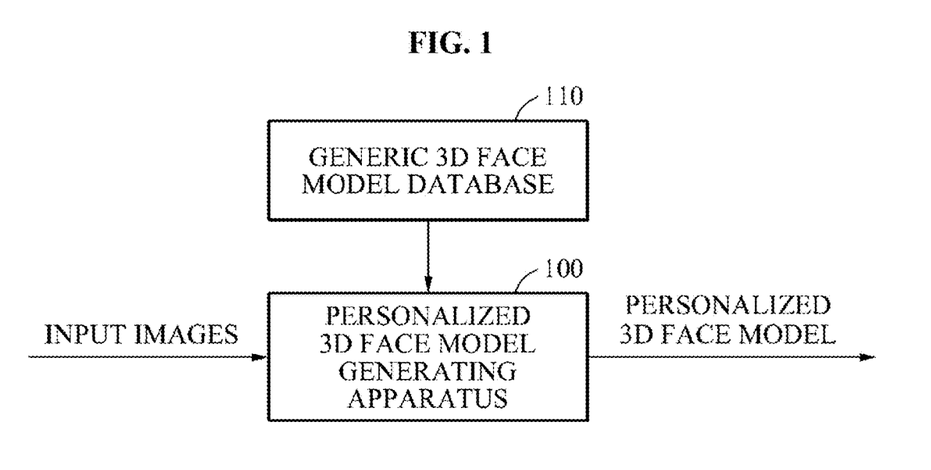
FIG. 1 is a diagram to describe the overall operation of an apparatus for generating a personalized three-dimensional (3D) face model according to example embodiments.

FIG. 1 is a diagram to describe the overall operation of an apparatus 100 for generating a personalized three-dimensional (3D) face model according to example embodiments.

Referring to FIG. 1, according to at least some example embodiments, the personalized 3D face model generating apparatus 100 generates a personalized 3D face model based on a plurality of input images. Input images may include input images captured from a user face to be modeled at different angles or in different directions. For example, face images may include at least one frontal face image captured from a front of the user face and at least one side face image captured from a side of the user face. A face image refers to a two-dimensional (2D) image captured from the user face, and may include a global area or a partial area of the user face.

According to at least one example embodiment of the inventive concepts, the 3D face model generating apparatus 100 may include or be implemented by one or more circuits or circuitry (e.g., hardware) specifically structured to carry out some or all of the operations described herein as being performed by the 3D face model generating apparatus 100 (or an element thereof). According to at least one example embodiment of the inventive concepts, the 3D face model generating apparatus 100 may include or be implemented by a memory and one or more processors executing computer-readable code (e.g., software) that is stored in the memory and includes instructions corresponding to some or all of the operations described herein as being performed by the 3D face model generating apparatus 100 (or an element thereof). According to at least one example embodiment of the inventive concepts, the 3D face model generating apparatus 100 may be implemented by, for example, a combination of the above-referenced hardware and processors executing computer-readable code.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

To generate a 3D face model representing a shape of a user face, the user may take a plurality of 2D face images using a camera. The taken 2D face images may be input to the personalized 3D face model generating apparatus 100. Face images in which the user face is taken in different directions may be acquired by taking a photo while fixing the user face and changing a location of the camera, or by taking a photo while fixing the camera and changing a direction of the user face.

The personalized 3D face model generating apparatus 100 may generate a personalized 3D face model by three-dimensionally modeling the user face based on the input face images. The personalized 3D face model generating apparatus 100 may generate the personalized 3D face model by selecting one of generic 3D face models stored in a generic 3D face model database 110 and by matching a shape of the selected generic 3D face model to a shape of the user face represented in each of the face images. A generic 3D face model refers to a statistical 3D shape model generated based on training data.

The personalized 3D face model generating apparatus 100 may generate the personalized 3D face model by extracting feature points of a face from the face images and by matching the extracted feature points to the generic 3D face model. Here, the "feature point of a face" or "facial feature point" may be a "facial keypoint" or a "facial landmark". For example, the personalized 3D face model generating apparatus 100 may generate a personalized 3D face model by extracting, from each of face images, feature points corresponding to eyebrows, eyes, a nose, lips, a chin, ears, and/or the face contour, and by deforming a generic 3D face model to be matched to the extracted feature points.

The personalized 3D face model generating apparatus 100 may generate a high-precision personalized 3D face model by quickly generating a coarse personalized 3D face model based on feature points extracted from face images and by refining a shape of the personalized 3D face model based on texture information of the face images.

The personalized 3D face model generating apparatus 100 may project the personalized 3D face model to each of the face images and may determine a correspondence point between the face images using the personalized 3D face model. The personalized 3D face model generating apparatus 100 may compare texture patterns of the face images in a peripheral area of the correspondence point, and may refine a shape of the personalized 3D face model, so that a similarity between the texture patterns of the face image may increase.

For example, a difference in texture patterns may be present in a correspondence area between a frontal face image to which the personalized 3D face model is projected and a side face image to which the personalized 3D face model is projected. A texture corresponding to a nose end of the personalized 3D face model may represent a texture of a nose in the frontal face image, and may represent a texture of a background in the side face image. The personalized 3D face model generating apparatus 100 may refine a shape of the personalized 3D face model so that the difference in texture patterns (i.e., between the frontal face image and the side face image) may decrease.

For example, the personalized 3D face model generating apparatus 100 may reduce a height of the nose of the personalized 3D face model until a texture of a nose end area is changed from the texture of the background to the texture of the nose in the side face image to which the personalized 3D face model is projected. The personalized 3D face model generating apparatus 100 may compare texture patterns of face images in another correspondence area based on the personalized 3D face model, and may refine the shape of the personalized 3D face model so that the difference in texture patterns may decrease.

The personalized 3D face model acquired through the aforementioned refining process may be utilized in a variety of application fields, for example, a facial recognition system and a security/surveillance system.

Figure 2:
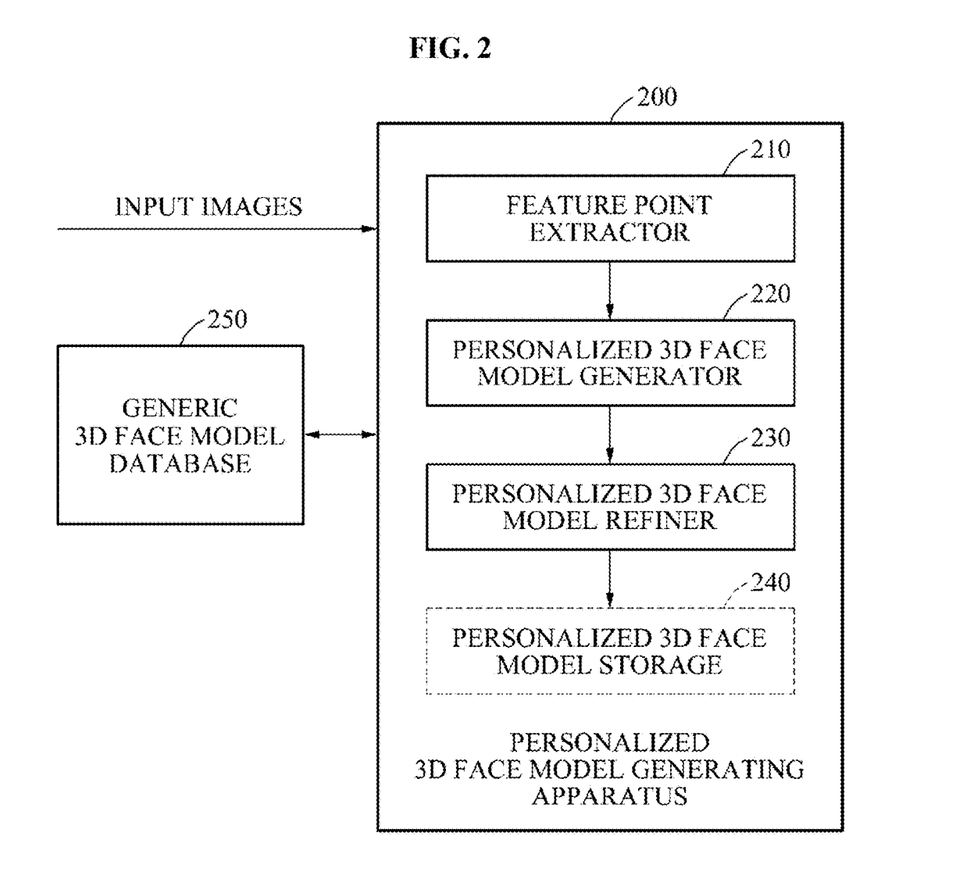
FIG. 2 is a block diagram illustrating an apparatus for generating a personalized 3D face model according to example embodiments.

FIG. 2 is a block diagram illustrating an apparatus 200 for generating a personalized 3D face model according to example embodiments. Referring to FIG. 2, the personalized 3D face model generating apparatus 200 includes a feature point extractor 210, a personalized 3D face model generator 220, and a personalized 3D face model refiner 230.

According to at least some example embodiments, the personalized 3D face model generating apparatus 200 receives input images including face images of a user and generates a personalized 3D face model representing a shape of the user face. The input images include two or more face images. Hereinafter, a description is made for conciseness based on an example in which the personalized 3D face model generating apparatus 200 generates a personalized 3D face model based on a first face image and a second face image. However, the example embodiments are not limited thereto and the personalized 3D face model generating apparatus 200 may also generate the personalized 3D face model based on three or more face images. For example, the personalized 3D face model generating apparatus 200 may generate a personalized 3D face model based on a group of images including a single frontal face image and a plurality of side face images.

According to at least one example embodiment of the inventive concepts, the 3D face model generating apparatus 200 may include or be implemented by one or more circuits or circuitry (e.g., hardware) specifically structured to carry out some or all of the operations described herein as being performed by the 3D face model generating apparatus 200 (or an element thereof). According to at least one example embodiment of the inventive concepts, the 3D face model generating apparatus 200 may include or be implemented by a memory and one or more processors executing computer-readable code (e.g., software) that is stored in the memory and includes instructions corresponding to some or all of the operations described herein as being performed by the 3D face model generating apparatus 200 (or an element thereof). According to at least one example embodiment of the inventive concepts, the 3D face model generating apparatus 200 may be implemented by, for example, a combination of the above-referenced hardware and processors executing computer-readable code.

According to at least some example embodiments, the feature point extractor 210 extracts facial feature points from input images including the first face image and the second face image. For example, the first face image may be a frontal face image captured from a front of a user face and the second face image may be a side face image captured from a side of the user face. The feature point extractor 210 may detect a facial area of the user by performing face tracking on the input images and may extract the facial feature points within the detected facial area.

Locations of feature points extracted from each of the face images may be defined in advance, for example, by a manufacture or user of the 3D face model generating apparatus 200. For example, the feature point extractor 210 may extract feature points located at eyebrows, eyes, a nose, lips, chin, and/or face contour from input images. The personalized 3D face model generating apparatus 200 may extract feature points from the input images using a variety of feature point extraction methods known in the art. For example, the feature point extractor 210 may extract facial feature points from input images using an active contour model (ACM), an active shape model (ASM), an active appearance model (AAM), a supervised descent method (SDM), and the like.

According to at least some example embodiments, the personalized 3D face model generator 220 deforms a generic 3D face model to a personalized 3D face model. The personalized 3D face model generating apparatus 200 may generate the personalized 3D face model by adjusting a pose and a shape of the generic 3D face model based on feature points extracted from input images. The generic 3D face model refers to a deformable 3D shape face model generated based on training data. The generic 3D face model includes vertices each having a spatial location. Spatial locations of the vertices may be determined based on a shape control parameter applied to the generic 3D face model. The personalized 3D face model generator 220 may acquire a 3D shape model by extracting 3D coordinates about a shape of the user face based on feature points extracted from input images, and by deforming the generic 3D face model to be matched to the extracted 3D coordinates.

The personalized 3D face model generator 220 may generate a further precise personalized 3D face model using feature points extracted from face images taken at different views. For example, when generating a personalized 3D face model based on only feature points extracted from a frontal face image, it may be difficult to accurately determine a height of nose and a shape of cheekbone. Feature points extracted from a face image taken at a different view, such as a side face image, include detailed information about the height of nose and the shape of cheekbone. Thus, it is possible to further precisely model a 3D face model of the user based on the extracted feature points.

The generic 3D face model may use, for example, one or more of a Candide face model, a Warter's face model, and a directly designed face model. The personalized 3D face model generator 220 may generate the personalized 3D face model by selecting one of generic 3D face models stored in a generic 3D face model database 250 and by matching a shape of the selected generic 3D face model to feature points extracted from input images.

For example, the personalized 3D face model generator 220 may deform a generic 3D face model to a personalized 3D face model by extracting a plurality of landmark points from the generic 3D face model and by matching feature points extracted from input images to the plurality of landmark points extracted from the generic 3D face model.

As another example, the personalized 3D face model generator 220 may acquire a personalized 3D face model by determining shape control parameters for deforming a shape of a generic 3D face model based on locations of feature points extracted from input images and by applying the determined shape control parameters to the generic 3D face model. For example, the personalized 3D face model generator 220 may determine shape control parameters to be applied to a generic 3D face model according to the following Equation 1:

$$\tau = \underset{\tau=(\tau_1,\ldots,\tau_n)}{\operatorname{argmin}} \sum_{k=1}^{m} \|Y_{2D,k} - P_k(\overline{S} + \Sigma\tau_i V_i)\|^2 \quad \text{[Equation 1]}$$

$$= \underset{\tau=(\tau_1,\ldots,\tau_n)}{\operatorname{argmin}} \tau^T V^T \sum_{k=1}^{m} (P^T P) V\tau - 2\sum_{k=1}^{m} (Y_{2D,k}^T P_k) V\tau$$

In Equation 1, $Y_{2D,k}$ denotes locations of feature points extracted from a $k^{th}$ face image, m denotes the number of face images, and $P_k$ denotes a matrix that performs a 2D perspective projection by warping the 3D generic face model based on a face pose estimated from the $k^{th}$ face image. $\overline{S}$ denotes parameters that represent a mean shape of the generic 3D face model, $\tau$ has an eigenvalue as shape control parameters to determine a deformation level of a shape of the generic 3D face model, and V has an eigenvector value as shape control parameters to determine a deformation direction of the shape of the generic 3D face model. The deformation direction of the shape of the generic 3D face model is determined. Further, n denotes the number of vertices that constitute the generic 3D face model. In $\tau_i$ and $V_i$, the subscript i denotes an index for identifying a vertex of the shape of the generic 3D face model to which each of $\tau$ and V is applied.

According to Equation 1, shape control parameters for matching vertices of the generic 3D face model to feature points extracted from face images by adjusting spatial locations of vertices in the mean shape of the generic 3D face model may be determined. The personalized 3D face model generator 220 may generate a 3D face shape model that represents a shape of the user face by applying the determined shape control parameters to vertices of the generic 3D face model.

The personalized 3D face model generator 220 may select a single reference face image from among input images and may generate a 3D face texture model based on texture information of the reference face image. The 3D face shape model refers to a model that includes shape information of the user face, and the 3D face texture model refers to a model that includes texture information in addition to the shape information of the user face. The 3D face shape model and the 3D face texture model are each types of the personalized 3D face model.

For example, the personalized 3D face model generator 220 may determine, as a reference face image, a face image having a least facial occlusion or a face image that represents a pose closest to a frontal face image among input images. The personalized 3D face model generator 220 may generate a 3D face texture model by mapping a texture of a reference face image to the 3D face shape model.

The personalized 3D face model refiner 230 may refine a personalized 3D face model by comparing texture patterns of face images. The personalized 3D face model refiner 230 may compare texture patterns of face images using the personalized 3D face model, and may refine a shape of the personalized 3D face model to minimize or, alternatively, reduce a difference in texture patterns.

The personalized 3D face model refiner 230 may project the personalized 3D face model to each of the first face image and the second face image. The personalized 3D face model refiner 230 may warp the personalized 3D face model to be matched to a face pose represented in each of face images, and may project the warped personalized 3D face model to the face images. The personalized 3D face model refiner 230 may refine the personalized 3D face model based on a difference in texture patterns between the first face image to which the personalized 3D face model is projected and the second face image to which the personalized 3D face model is projected.

The personalized 3D face model refiner 230 may extract a correspondence point between the first face image to which the personalized 3D face model is projected and the second face image to which the personalized 3D face model is projected. The personalized 3D face model refiner 230 may compare a texture pattern of the first face image and a texture pattern of the second face image in a peripheral area of the correspondence point, and may refine the shape of the personalized 3D face model based on a result of comparing the texture patterns. The personalized 3D face model refiner 230 may compare texture patterns of peripheral areas for the respective correspondence points, and may adjust spatial locations of vertices constituting the personalized 3D face model, so that the difference in texture patterns is minimize or, alternatively, reduced.

When projecting the personalized 3D face model to the first face image, the personalized 3D face model may be warped to be matched to a face pose of the first face image and vertices of the personalized 3D face model may be projected to the first face image. Similarly, when projecting the personalized 3D face model to the second face image, the personalized 3D face model may be warped to be matched to a face pose of the second face image and vertices of the personalized 3D face model may be projected to the second face image.

Since an identical set of vertices of the personalized 3D face model is projected to each of face images, locations of correspondence points between the face images may be identified based on locations of the vertices of the personalized 3D face model projected to each of the face images. According to example embodiments, the personalized 3D face model refiner 230 may identify a location of a correspondence point between face images to which the personalized 3D face model is projected, based on a barycentric coordinate characteristic that a barycenter is maintained irrespective of a deformation of a triangle.

The personalized 3D face model refiner 230 may compare the texture pattern of the first face image and the texture pattern of the second face image in the peripheral area of the identified correspondence point, and may determine whether to adjust a location of a vertex of the personalized 3D face model corresponding to the correspondence point. The personalized 3D face model refiner 230 may adjust spatial locations of vertices of the personalized 3D face model to make the texture pattern of the first face image become similar to (e.g., above a threshold degree of similarity with respect to) the texture pattern of the second face image in the peripheral area of the correspondence point. The shape of the personalized 3D face model may be further precisely refined by adjusting the spatial locations of vertices.

The personalized 3D face model refiner 230 may determine a pose deformation parameter and a shape control parameter that minimize or, alternatively, reduce a difference in texture patterns between the first face image and the second face image in the peripheral area of the correspondence point. For example, the personalized 3D face model refiner 230 may determine a pose deformation parameter and a shape control parameter to refine a personalized 3D face model according to the following Equation 2. Here, it is assumed that the first face image is determined as the reference face image.

$$(R, \tau) = \underset{(R_i, \tau_p)}{\operatorname{argmin}} \sum_i \|I_{ref} - W(I_i, PR_i(\overline{S}_p + V_p \tau_p))\|^2 \quad \text{[Equation 2]}$$

In Equation 2, $\overline{S}_p$ denotes parameters that represent a mean shape of the personalized 3D face model, $\tau_p$ has an eigenvalue as shape control parameters to determine a deformation level of a shape of the personalized 3D face model. The shape control parameters are used to determine a spatial location of each of vertices constituting the personalized 3D face model. $V_p$ has an eigenvector value as shape control parameters to determine a deformation direction of the shape of the personalized 3D face model.

The element Ri corresponding to one of pose deformation parameters denotes a matrix to deform a pose of the personalized 3D face model between the second face image and the first face image. P denotes a matrix that performs a 2D perspective projection of the personalized 3D face model to which the shape control parameter and the pose deformation parameter are applied. W denotes a warping function that realigns a location of a texture using shape and location deformation matrices. Ii denotes a texture of the second face image and Iref denotes a texture of the first face image determined as the reference face image.

According to Equation 2, pose deformation parameters and shape control parameters that minimize or, alternatively, reduce a difference in texture patterns between the first face image and the second face image may be determined. The personalized 3D face model refiner 230 may further precisely refine the personalized 3D face model by applying the determined pose deformation parameters and shape control parameters to the personalized 3D face model. The personalized 3D face model refiner 230 may iteratively refine a shape of the personalized 3D face model until the difference in texture patterns between the first face image and the second face image satisfies a predetermined or, alternatively, desired condition.

According to example embodiments, the personalized 3D face model generating apparatus 200 may further include a personalized 3D face model storage 240. The personalized 3D face model storage 240 may store a finally refined personalized 3D face model. The personalized 3D face model storage 240 may store personalized 3D face models corresponding to users, respectively.

The personalized 3D face model generating apparatus 200 may update a personalized 3D face model stored in the personalized 3D face model storage 240. When a new face image captured from the user face is input, the personalized 3D face model generating apparatus 200 may extract feature points of a face from the new face image and may update a previously generated personalized 3D face model based on the extracted feature points.

Figure 3:
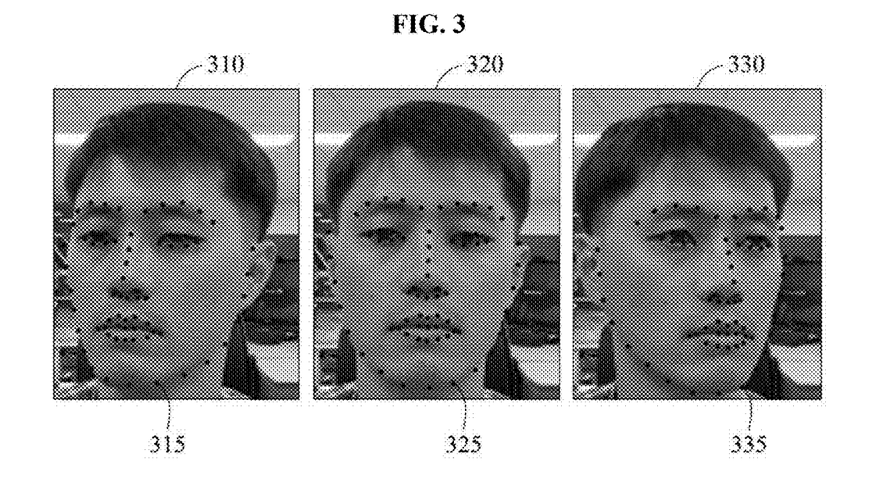
FIG. 3 illustrates face images to describe a process of extracting feature points from input images according to example embodiments.

FIG. 3 illustrates face images 310, 320, and 330 to describe a process of extracting feature points from input images according to example embodiments.

Referring to FIG. 3, the face image 320 denotes a frontal face image captured from a front of a user face, the face image 310 denotes a left-side face image captured from a left-side of the user face, and the face image 330 denotes a right-side face image captured from a right-side of the user face.

The global 2D shape information and texture information about the user face may be extracted from the face image 320. Further detailed information about a shape of the user face may be extracted from the face images 310 and 330.

A personalized 3D face model generating apparatus may extract facial feature points 315, 325, and 335 from the face images 310, 320, and 330, respectively. The personalized 3D face model generating apparatus may detect a facial area from each of the face images 310, 320, and 330, and may extract facial feature points corresponding to eyebrows, eyes, a nose, lips, chin, and/or face contour within the detected facial area. For example, the personalized 3D face model generating apparatus may extract facial feature points from each of the face images 310, 320, and 330 using a variety of methods known in the art, for example, an ASM, an AAM, and an SDM FIG. 4 illustrates face models to describe a process of generating a personalized 3D face model by deforming a generic 3D face model according to example embodiments.

Figure 4:
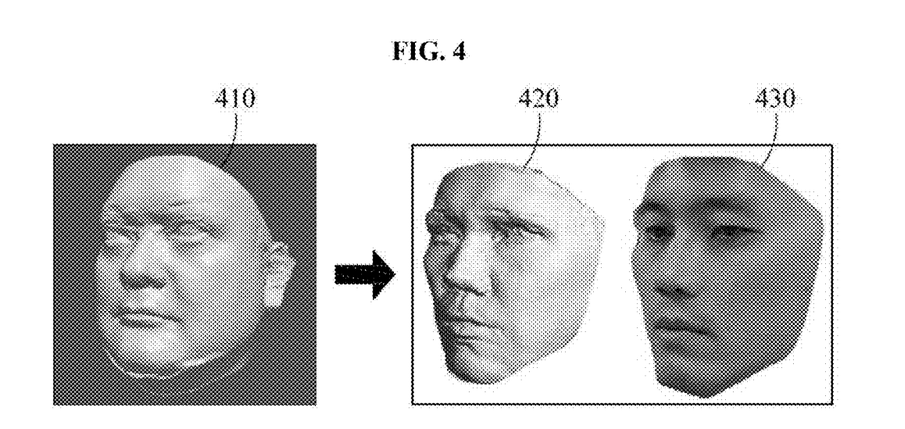
FIG. 4 illustrates face models to describe a process of generating a personalized 3D face model by deforming a generic 3D face model according to example embodiments.

Referring to FIG. 4, a generic 3D face model 410 and personalized 3D face models 420 and 430 are illustrated. The generic 3D face model 410 refers to a deformable 3D shape model generated based on 3D face training data, and also refers to a parametric model capable of representing a shape of a user face using a mean shape and a parameter.

A personalized 3D face model generating apparatus may personalize the generic 3D face model 410 based on a plurality of face images captured from the user face. The personalized 3D face model generating apparatus may extract facial feature points from the face images, and may determine a parameter capable of matching the extracted facial feature points to landmark points of the generic 3D face model 410. The personalized 3D face model generating apparatus may generate the personalized 3D face models 420 and 430 by applying the determined parameter to the generic 3D face model 410. Each of the personalized 3D face models 420 and 430 refers to a 3D face model of which a pose or an expression is deformable.

The personalized 3D face model 420 refers to a 3D face model that includes only shape information and does not include texture information. The personalized 3D face model 430 refers to a 3D face model that includes both shape information and texture information. The personalized 3D face model generating apparatus may generate the personalized 3D face model 430 to which a texture is applied by mapping the texture extracted from at least one of the face images to the personalized 3D face model 420. The personalized 3D face model 430 that further includes texture information has a higher precision than the personalized 3D face model 420 that includes only the shape information. In addition, the personalized 3D face model 430 includes a more number of vertices.

Figure 5:
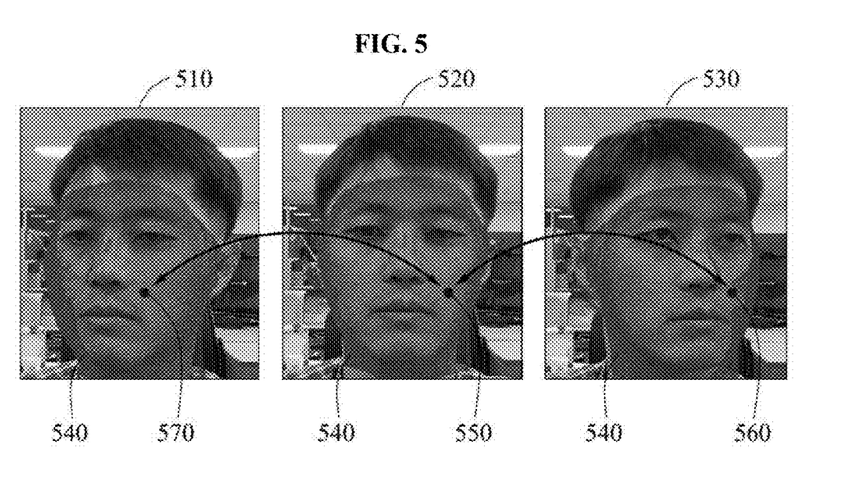
FIG. 5 illustrates face images to describe a process of projecting a personalized 3D face model to input images, comparing texture patterns of the input images, and refining the personalized 3D face model according to example embodiments.

FIG. 5 illustrates face images 510, 520, and 530 to describe a process of projecting a personalized 3D face model to input images, comparing texture patterns of the input images, and refining the personalized 3D face model according to example embodiments.

Referring to FIG. 5, the face image 520 refers to a frontal face image, the face image 510 refers to a left-side face image, and the face image 530 refers to a right-side face image. Here, it is assumed that the face image 520 is determined as a reference face image.

A personalized 3D face model generating apparatus may project a personalized 3D face model 540 to each of the face images 510, 520, and 530. The personalized 3D face model 540 may represent a user face in a 3D shape using vertices. The personalized 3D face model generating apparatus may warp the personalized 3D face model 540 based on a face pose represented in each of the face images 510, 520, and 530, and then may perform 2D perspective projection on each of the face images 510, 520, and 530.

The personalized 3D face model generating apparatus may extract a correspondence point among the face images 510, 520, and 530 to which the personalized 3D face model 540 is projected. For example, a point 570 of the face image 510, a point 550 of the face image 520, and a point 560 of the face point 530 are assumed as a correspondence point. An area in which the same vertex of the personalized 3D face model 540 is located in each of the face images 510, 520, and 530 may be determined as an area in which the correspondence point is located.

The personalized 3D face model generating apparatus may compare texture patterns in a peripheral area of a correspondence point between the face image 520 determined as the reference face image and the face image 510, and may refine a shape of the personalized 3D face model 540 based on a difference in the texture patterns. The personalized 3D face model generating apparatus may refine the shape of the personalized 3D face model 540 to minimize or, alternatively, reduce the difference in texture patterns between the face image 520 and the face image 510 in the peripheral area of the correspondence point. For example, according to Equation 2, the personalized 3D face model generating apparatus may more precisely refine the personalized 3D face model 540 by determining a pose deformation parameter and a shape control parameter to minimize or, alternatively, reduce a difference in texture patterns between the face images 510 and 520 in a peripheral area of each correspondence point, and by applying the determined pose deformation parameter and shape control parameter to the personalized 3D face model 540.

The personalized 3D face model generating apparatus may compare texture patterns only in a peripheral area of a correspondence point between the face image 520 determined as the reference face image and the face image 530, and may refine a shape of the personalized 3D face model 540 to minimize or, alternatively, reduce a difference in the texture patterns in the peripheral area of the correspondence point.

Figure 6:
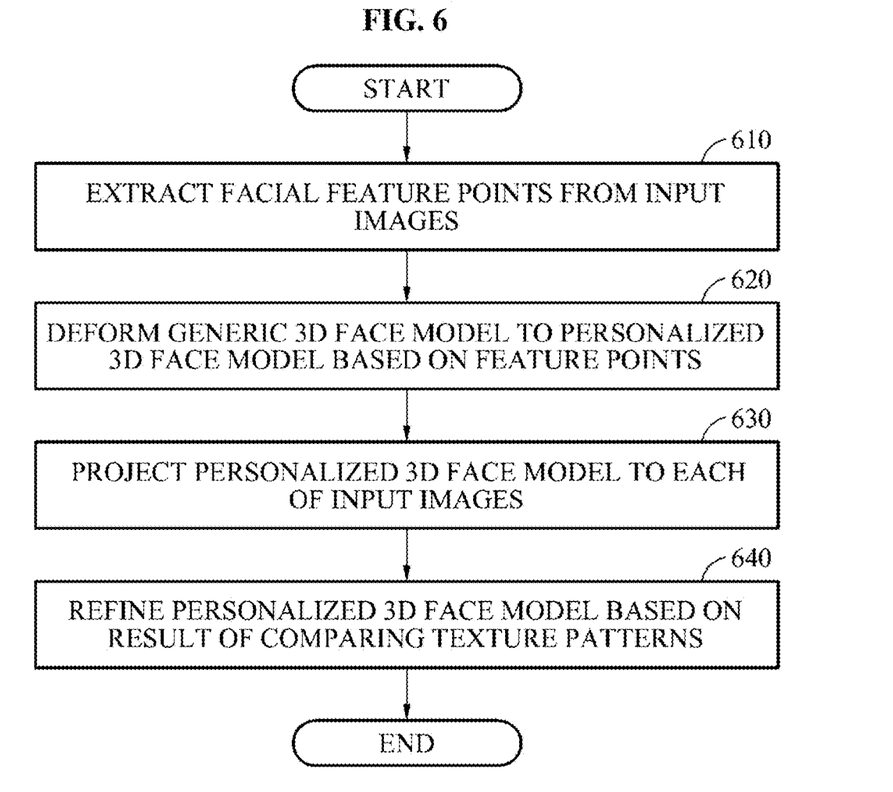
FIG. 6 is a flowchart illustrating a method of generating a personalized 3D face model according to example embodiments.

FIG. 6 is a flowchart illustrating a method of generating a personalized 3D face model according to example embodiments.

In operation 610, a personalized 3D face model generating apparatus extracts facial feature points from input images. The personalized 3D face model generating apparatus may detect a facial area of a user by performing face tracking on the input images and may extract the facial feature points within the detected facial area. For example, the personalized 3D face model generating apparatus may extract facial feature points located at eyebrows, eyes, a nose, lips, chin, and/or face contour from input images using an ACM, an ASM, an AAM, an SDM, and the like.

In operation 620, the personalized 3D face model generating apparatus may deform a generic 3D face model to the personalized 3D face model based on the extracted feature points. The personalized 3D face model generating apparatus may acquire a 3D shape model by extracting 3D coordinates based on the feature points extracted from the input images and by deforming the generic 3D face model to be matched to the extracted 3D coordinates.

The generic 3D face model may use, for example, a Candide face model, a Warter's face model, and a directly designed face model. The personalized 3D face model generating apparatus may generate the personalized 3D face model by selecting one of generic 3D face models and by matching a shape of the selected generic 3D face model to feature points extracted from input images. The personalized 3D face model generating apparatus may acquire a personalized 3D face model by determining shape control parameters for deforming a shape of the generic 3D face model based on locations of feature points extracted from input images and by applying the determined shape control parameters to the generic 3D face model.

In operation 630, the personalized 3D face model generating apparatus may project the personalized 3D face model to each of the input images. The personalized 3D face model generating apparatus may warp the personalized 3D face model to be matched to a face pose represented in each of face images, and may project the warped personalized 3D face model to the face images.

In operation 640, the personalized 3D face model generating apparatus may compare texture patterns of face images based on the personalized 3D face model and may refine the personalized 3D face model based on a result of comparing the texture patterns. For example, the personalized 3D face model generating apparatus may refine a personalized 3D face model based on a difference in texture patterns between a first face image to which the personalized 3D face model is projected and a second face image to which the personalized 3D face model is projected. The personalized 3D face model generating apparatus may refine a shape of the personalized 3D face model to minimize or, alternatively, reduce the difference in texture patterns between face images based on the personalized 3D face model. Operation 640 will be further described with reference to FIG. 7.

Figure 7:
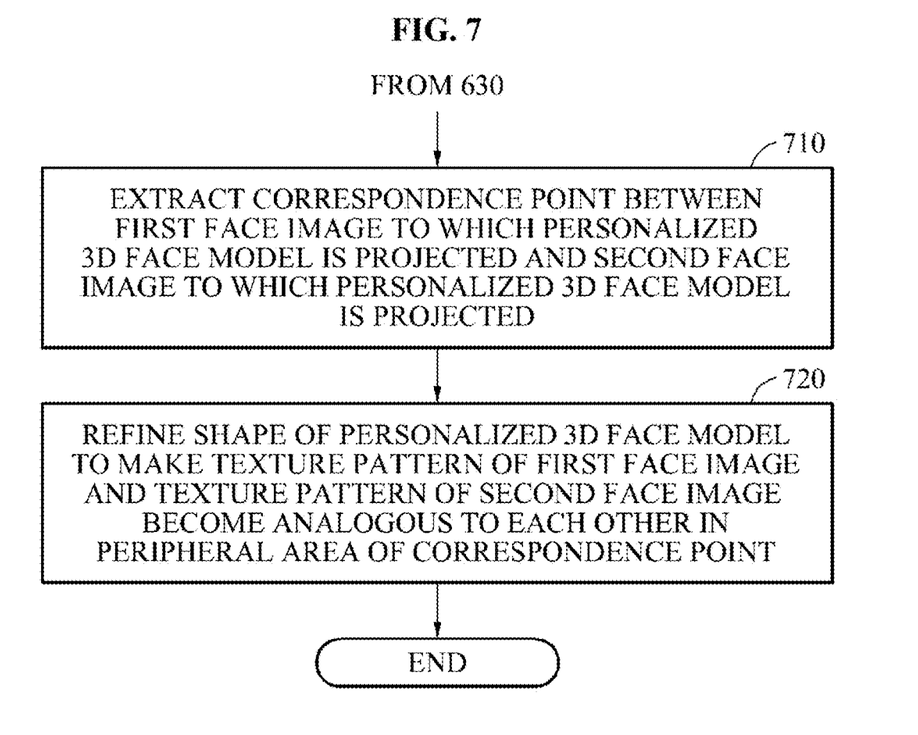
FIG. 7 is a flowchart illustrating in detail an operation of refining a personalized 3D face model in a method of generating the personalized 3D face model according to example embodiments.

FIG. 7 is a flowchart illustrating in detail operation 640 of refining a personalized 3D face model in a method of generating the personalized 3D face model according to example embodiments.

In operation 710, the personalized 3D face model generating apparatus may extract a correspondence point between the first face image to which the personalized 3D face model is projected and the second face image to which the personalized 3D face model is projected. The personalized 3D face model generating apparatus may extract a correspondence point between face images based on locations of vertices of the personalized 3D face model projected to each of the face images.

In operation 720, the personalized 3D face model generating apparatus may refine the shape of the personalized 3D face model to make the texture pattern of the first face image and the texture pattern of the second face image become similar to (e.g., above a threshold degree of similarity with respect to) each other in the peripheral area of the correspondence point. The personalized 3D face model generating apparatus may refine the shape of the personalized 3D face model to minimize or, alternatively, reduce the difference in texture patterns between face images in the peripheral area of the correspondence point. For example, according to Equation 2, the personalized 3D face model generating apparatus may refine a shape of a personalized 3D face model by determining a pose deformation parameter and a shape control parameter that minimize or, alternatively, reduce a difference in texture patterns between face images and by applying the determined pose deformation parameter and shape control parameter to the personalized 3D face model.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby deforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of generating a three-dimensional (3D) face model, the method comprising:
extracting feature points of a face from input images comprising a first face image and a second face image;
deforming a generic 3D face model to a personalized 3D face model based on the feature points;
projecting the personalized 3D face model to each of the first face image and the second face image; and
refining the personalized 3D face model based on a difference in texture patterns between the first face image to which the personalized 3D face model is projected and the second face image to which the personalized 3D face model is projected,
wherein the refining comprises:
extracting a correspondence point between the first face image to which the personalized 3D face model is projected and the second face image to which the personalized 3D face model is projected;
generating a comparison based on a texture pattern of the first face image and a texture pattern of the second face image in a peripheral area of the correspondence point; and
refining a shape of the personalized 3D face model to make a similarity between the texture pattern of the first face image and the texture pattern of the second face image exceed a threshold degree of similarity in the peripheral area of the correspondence point.

2. The method of claim 1, wherein the refining includes, iteratively,
determining if a first condition is satisfied, and
refining a shape of the personalized 3D face model based on the difference in texture patterns,
until the first condition is satisfied.

3. The method of claim 1, wherein the refining comprises:
determining a pose deformation parameter and a shape control parameter that reduce the difference in texture patterns between the first face image and the second face image in the peripheral area of the correspondence point; and
applying the determined pose deformation parameter and shape control parameter to the personalized 3D face model.

4. The method of claim 3, wherein the shape control parameter controls a spatial location of each of vertices constituting the personalized 3D face model.

5. The method of claim 1, wherein the projecting comprises:
projecting the personalized 3D face model to the first face image based on a facial pose included in the first face image; and
projecting the personalized 3D face model to the second face image based on a facial pose included in the second face image.

6. The method of claim 1, wherein the deforming comprises:
acquiring the personalized 3D face model by mapping landmark points of the generic 3D face model to the extracted feature points.

7. The method of claim 1, wherein the input images are two-dimensional (2D) images, and
the input images comprise at least one frontal image captured from a front of a user face and at least one side face image captured from a side of the user face.

8. A non-transitory computer-readable medium storing a computer-readable instructions that, when executed by one or more processors, cause the one or more processors to perform operations including,
extracting feature points of a face from input images comprising a first face image and a second face image,
deforming a generic 3D face model to a personalized 3D face model based on the feature points,
projecting the personalized 3D face model to each of the first face image and the second face image, and
refining the personalized 3D face model based on a difference in texture patterns between the first face image to which the personalized 3D face model is projected and the second face image to which the personalized 3D face model is projected,
wherein the refining comprises:
extracting a correspondence point between the first face image to which the personalized 3D face model is projected and the second face image to which the personalized 3D face model is projected;

generating a comparison based on a texture pattern of the first face image and a texture pattern of the second face image in a peripheral area of the correspondence point; and refining a shape of the personalized 3D face model to make a similarity between the texture pattern of the first face image and the texture pattern of the second face image exceed a threshold degree of similarity in the peripheral area of the correspondence point.

9. An apparatus for generating a three-dimensional (3D) face model, the apparatus comprising:

a memory storing computer-readable instructions; and one or more processors configured to execute the computer-readable instructions to, extract feature points of a face from input images comprising a first face image and a second face image, deform a generic 3D face model to a personalized 3D face model based on the feature points, and refine the personalized 3D face model based on a difference in texture patterns between the first face image to which the personalized 3D face model is projected and the second face image to which the personalized 3D face model is projected, wherein the one or more processors are configured such that the refining includes, extracting a correspondence point between the first face image to which the personalized 3D face model is projected and the second face image to which the personalized 3D face model is projected, comparing a texture pattern of the first face image and a texture pattern of the second face image in a peripheral area of the correspondence point, and refining a shape of the personalized 3D face model to make a similarity between the texture pattern of the first face image and the texture pattern of the second face image exceed a threshold degree of similarity in the peripheral area of the correspondence point.

10. The apparatus of claim 9, wherein the one or more processors are configured to, iteratively, determine if a first condition is satisfied, and refine a shape of the personalized 3D face model based on the difference in texture patterns, until the first condition is satisfied.

11. The apparatus of claim 9, wherein the one or more processors are configured to, determine a pose deformation parameter and a shape control parameter that reduce the difference in texture patterns between the first face image and the second face image in the peripheral area of the correspondence point, and apply the determined pose deformation parameter and shape control parameter to the personalized 3D face model.

12. The apparatus of claim 9, wherein the one or more processors are further configured to execute the computer-readable instructions to store the refined personalized 3D face model.

13. The apparatus of claim 9, wherein the one or more processors are configured to acquire the personalized 3D face model by mapping landmark points of the generic 3D face model to the extracted feature points.

14. The apparatus of claim 9, wherein the input images are two-dimensional (2D) images, and the input images includes at least one frontal image captured from a front of a user face and at least one side face image captured from a side of the user face.

* * * * *